(No Model.)
R. N. R. PHELPS.
FLOAT FOR WATER GAGES.
No. 340,456. Patented Apr. 20, 1886.
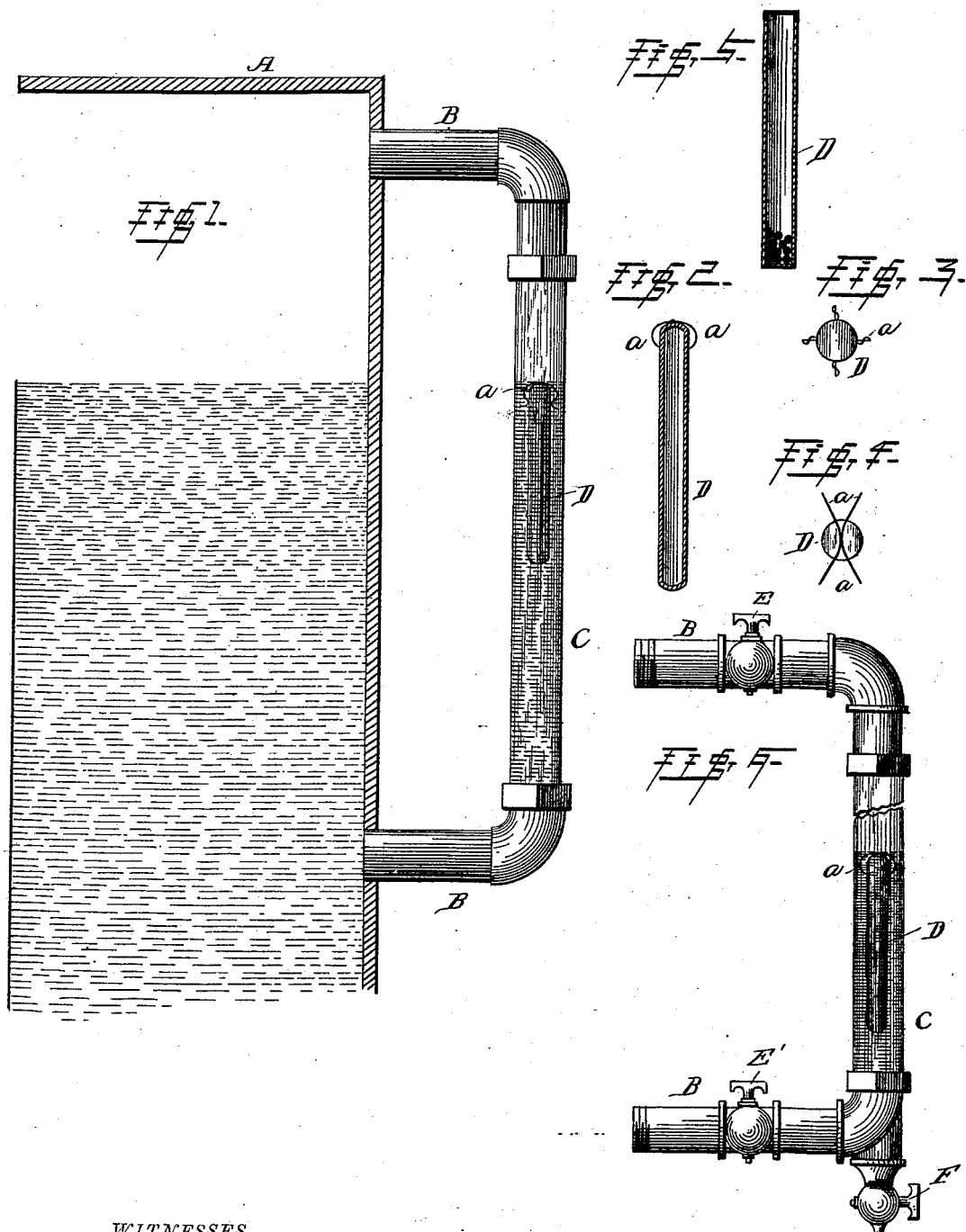
WITNESSES
W. E. Bowen
Geo. H. Harvey
INVENTOR
Richard N. R. Phelps,
By J. E. M. Bowen
Attorney.

UNITED STATES PATENT OFFICE.

RICHARD N. R. PHELPS, OF NEW YORK, N. Y., ASSIGNOR TO THE NEW YORK SAFETY GAGE COMPANY.

FLOAT FOR WATER-GAGES.

SPECIFICATION forming part of Letters Patent No. 340,456, dated April 20, 1886.

Application filed December 18, 1885. Serial No. 186,099. (No model.)

*To all whom it may concern:*

Be it known that I, RICHARD N. R. PHELPS, a citizen of the United States, and a resident of New York, in the county of New York and State of New York, have invented certain new and useful Improvements in Water-Gages for Steam-Boilers and Floats Therefor, of which the following is a specification.

My invention relates to gages for indicating the level of the water in steam-boilers; and it has for its object the production of a gage of the character mentioned, which may be depended upon at all times and under all circumstances to distinctly indicate the height of the water-line in the boiler.

The invention is hereinafter described, and the features of novelty for which protection is desired are pointed out in the claims at the end of this specification.

In the accompanying drawings, which form a part of this description, and in which like parts are indicated by like letters, Figure 1 is a side elevation, partly in section, of a portion of a steam-boiler provided with a water-gage. Fig. 2 is a vertical section of the float. Figs. 3 and 4 are top plan views of other embodiments of the float. Fig. 5 is a vertical section of still another embodiment of the float; and Fig. 6 is a side elevation of the water-gage, showing the valves in the pipes which connect the gage to the boiler, as well as the blow-off cock at the lower end of the gage.

Referring to the drawings, A represents a steam-boiler, and B B the pipes, by which the gage-tube C is connected to the boiler. The pipes B B and gage-tube C, with their connections, are of the usual construction.

The gage-tube C is of transparent material, preferably of glass, and it is secured in position between the pipes B B by steam and water tight joints. The tube C is of the usual dimensions, and its function is, as indicated, to display the water-level within the boiler. Ordinarily, these tubes are employed without any contained device adapted to rise and fall with the changes of the water-level within the boiler; but, when thus employed, they imperfectly serve as indicators of the true condition of the height of the water in the boiler, as sedimentary matter in the water and dust from without will adhere to the surface of the glass and render it difficult oftentimes, even under favorable conditions as to light, to distinguish the true water-line.

The advantages of a transparent gage-tube over an opaque tube, combined with external indicating devices, are sufficiently obvious to need no comment.

I construct my float, which is marked D in the several views, of thin metal, and preferably in the form of an elongated cylinder, about six or eight times greater in length than in diameter, and of sufficient length to prevent it from turning the curve and passing through the pipe B into the boiler.

When properly made and securely sealed, so as to be air-tight, a metallic float of the character described will maintain a position in the water in the tube with its upper end just on a line with the surface of the water, and will rise and fall with the changes of the water-level in the boiler.

In the construction of a glass float it is very difficult to obtain the required size and insure the necessary strength of material to resist the usual steam-pressure without adding so largely to the weight of the float as to render it difficult to be floated.

While it is obvious that a round or pear-shaped glass float is not liable to adhere to the surface of the gage-tube, the use of such a float is not practicable in the ordinary steam-boiler gage-tube, since it cannot be made large enough to insure its being floated.

I overcome the above-mentioned difficulties incident to the use of glass floats by the employment of a float of thin metal, constructed substantially as hereinbefore stated. While such a metallic float performs its function with general accuracy, actual experience shows that, owing to the lightness necessary to make it float, it is apt to adhere to the sides of the glass gage, so that the retreating level in the boiler leaves the float sticking against the gage rather than floating upon the water. To provide against this contingency, I place upon the end of the float a guard or guards, so as to prevent the surface of the cylindrical float from approaching the surface of the gage-tube. Should this guard project at right angles to the length of the float, it would be apt to catch in the spaces between the glass tube and the packing in the stuffing-boxes. To prevent this, I so bend or twist this guard or train it down against the sides of the float as to prevent it from catching should the water carry the float to the top of the tube. This guard may be of various forms. In Fig. 4 it is shown in the form of pieces of wire, $a$, soldered at the top of the float D and projecting a short distance beyond the surface of the float. These wires should be bent downward or upward, so as to prevent them from catching in the stuffing-boxes, as before explained. In Fig. 2 the wires $a$ are soldered, as in Fig. 4, and then bent down, as shown, until their ends come in contact with the surface of the float. In Fig. 3 the guards $a$ are integral with the cap of the float, and may be twisted in the form shown. The float shown in the gage-tube of Fig. 1 is provided with guards similar to those shown in Fig. 2, but their ends, after being bent downward, are turned outward in the manner shown. In Fig. 5 the float D is shown provided with weights, for the purpose of weighting its lower end, with the effect of preventing the possibility of the adhesion of its upper end to the sides of the glass gage-tube. Any of these described means as a safeguard against the adhesion of the float to the gage-tube may be employed in carrying out my invention, and they will all operate equally satisfactorily.

As shown in Fig. 6, the pipes B B are fitted with valves or cocks E E', of any desirable pattern, to open and close at will communication between the water and steam spaces of the boiler and the gage-tube C. At the lower end of the tube C the coupling is provided with a cock, F, which is adapted to be opened, to permit the gage-tube and connections to be blown out for the purpose of cleaning the same.

Having thus described my invention, what I claim as new, and desire to secure by Letters Patent, is—

1. A transparent gage-tube of ordinary type, with unobstructed interior, provided with boiler-connections having valves, as explained, combined with an elongated cylindrical float, of thin metal, provided with a guard, substantially as set forth.

2. An elongated cylindrical float, of metal, provided with a wire guard at one of its ends and bent over or trained down along its sides, substantially as and for the purpose set forth.

Signed at New York, in the county of New York and State of New York, this 30th day of November, A. D. 1885.

RICHARD N. R. PHELPS.

Witnesses:
J. E. M. BOWEN,
D. FRANK ROOT.